United States Patent [19]

Zimmermann

[11] Patent Number: 5,485,050
[45] Date of Patent: Jan. 16, 1996

[54] DEVICE FOR HOLDING THE ENDS OF THE TURNS OF A STATOR WINDING IN A DYNAMOELECTRIC MACHINE

[75] Inventor: Hans Zimmermann, Mönchaltorf, Switzerland

[73] Assignee: ABB Management AG, Baden, Switzerland

[21] Appl. No.: 388,435

[22] Filed: Feb. 14, 1995

[30] Foreign Application Priority Data

Feb. 26, 1994 [DE] Germany ........................ 44 06 400.4

[51] Int. Cl.$^6$ .................................................. H02K 3/46
[52] U.S. Cl. ............................ 310/260; 310/91; 310/214
[58] Field of Search .................................. 310/260, 270, 310/45, 91, 214

[56] References Cited

U.S. PATENT DOCUMENTS

| Re. 28,478 | 7/1975 | Bahn | 310/260 |
|---|---|---|---|
| 3,293,472 | 12/1966 | Stevens | 310/45 |
| 3,344,296 | 9/1967 | Coggeshall | 310/260 |
| 3,991,334 | 11/1976 | Cooper | 310/260 |
| 4,318,021 | 3/1982 | Johansson | 310/260 |
| 4,563,607 | 1/1986 | Cooper | 310/260 |
| 5,140,740 | 8/1992 | Weigelt | |
| 5,355,046 | 10/1994 | Weigelt | 310/260 |
| 5,373,211 | 12/1994 | Ramirez-Coronel | 310/260 |

FOREIGN PATENT DOCUMENTS

| 2249467 | 5/1975 | France . |
|---|---|---|
| 1463796 | 3/1969 | Germany . |
| 1613125 | 1/1971 | Germany . |
| 4024395 | 3/1991 | Germany . |

OTHER PUBLICATIONS

Firmenschrift BBC, Brown Boveri, Druckvermerk HTGG 104 108 D.
N.N.: Erfolgreiche Nachrustung Eines 970–MVA–Turbogenerators. In: ABB Technik Mar. 1988.

*Primary Examiner*—R. Skudy
*Attorney, Agent, or Firm*—Oblon, Spivak, McClelland, Maier, & Neustadt

[57] ABSTRACT

The winding overhang support of a turbo-generator comprises an inner ring (12) which fits closely, either directly or with the insertion of an interlayer (14), against the ends of the turns of the stator winding (4, 5), which ends widen like an internal taper, and a multipart external support comprising rings (9, 27) and supporting brackets (7). The supporting brackets (7) are attached to the end of the stator core end plate (3) of the laminated core. The first outer ring (9), which is composed of insulating material, fits closely against the outside of the free ends of the supporting brackets (7). The second outer ring (27) is manufactured from high-strength nonmagnetic steel and is supported on a shoulder (26) on the stator core end plate (3) and is attached to the supporting brackets (7). There are double-wedge clamps (16, 17, 20) between the inward-facing surfaces (18, 19) of the supporting brackets (7) and the ends of the turns.

Due to the support of the second outer ring (27) on the shoulder (26) of the stator core end plate (3), it can only expand in itself but cannot deform into an oval shape. This makes the winding overhang support very rigid radially and meets all requirements of practical service, especially in the case of a short circuit.

18 Claims, 3 Drawing Sheets

DEVICE FOR HOLDING THE ENDS OF THE TURNS OF A STATOR WINDING IN A DYNAMOELECTRIC MACHINE

BACKGROUND OF THE INVENTION

1. Field of the Invention

The invention relates to a device for holding the ends of the turns of a stator winding in a dynamo-electric machine, comprising a rotor and a stator and a stator housing, which stator has a laminated core with stator core end plates at the end, there being arranged in slots in the laminated core a stator winding which has bottom and top bars and the ends of which overlap the laminated core axially, which holder has an inner ring which fits closely, either directly or with the interposition of all interlayer, against the ends of the turns of the stator winding, which ends widen like an internal taper, and which has a multipart external support comprising rings and supporting brackets, which supporting brackets are attached to the end of the laminated core.

In this regard, the invention refers to a prior art as disclosed, for example, in U.S. Pat. No. 5,140,740, identical in content to the latter.

2. Discussion of Background

Fastening the ends of the windings of the stator windings (winding overhang) of turbo-generators poses certain problems because of the high stresses to which these winding overhangs are subjected. The origin of these stresses lies in electromagnetic force effects, in particular in the case of short-circuiting, in vibration phenomena and in differences between the thermal expansion of the stator bars and that of the stator iron during operation. These loads lead sooner or later to instances of loosening and wear phenomena, which lead ultimately to earth shorts and short circuits.

A number of systems have been introduced to improve the strength of the winding overhangs of large electric machines, the majority of these systems working with one-piece rings made from insulating material as the central support element.

In the device for holding the ends of the turns of a stator winding in an electric machine according to German Offenlegungsschrift 1,613,125, an outer ring fits closely from outside against a portion of the external layers of the ends of the turns. An inner ring, which is independent of the outer ring, engages on the inner layers of the ends of the turns. In order to prevent axial displacement of the two rings relative to one another, devices in the form of C-shaped bows which embrace the ends of the turns are provided to connect the two rings. The two rings are screwed to axially extending holders which, for their part, are attached to the end of the stator laminated core.

The winding overhang holder according to U.S. Pat. No. 4,800,314 uses just one outer ring. The winding overhang ends are wedged and bonded together in groups and fastened to this outer ring by means of bands.

A further solution to the problem of support, intended particularly for retrofitting, is the subject-matter of U.S. Pat. No. 5,140,740 which is identical in content. The holder proposed there has an inner ring which fits closely against the ends of the turns of the stator winding, which ends widen like an internal taper. The external support consists of an at least two-part ring or of supporting beams which extend in the circumferential direction and are interconnected.

Tie rods which engage on the inner ring and outer ring or on the supporting beams serve to brace the inner ring and the external support. Alternatively, in the known solution, the outer ring and the tie rods can be dispensed with (FIG. 4). Together with the end bows of the winding overhang, the inner ring is then supported, with the interposition of clamping wedges, on supports which are attached to the end of the stator laminated core. The disadvantage in both alternatives is that when the winding overhang unit becomes loose, they can only be retightened with a great deal of effort.

Common to all the known embodiments is that the external support is provided by rings. Rings of this kind expand under the action of the rotating electromagnetic forces, become oval and can thus fulfill their supporting function only in part.

SUMMARY OF THE INVENTION

Accordingly, one object of the invention is to provide a novel holder of the type stated at the outset which can be produced economically and simply, reliably withstands all operating stresses of the type mentioned and, particularly after any loosening which may occur in the winding overhang unit, can be retightened.

This object is achieved, according to the invention, by providing a first outer ring which fits closely against the outside of the free ends of the supporting brackets, by providing a second outer ring which is supported at least in part on a shoulder on the stator core end plate, by attaching the second outer ring to the supporting brackets and by providing clamping means between the inward-facing surfaces of the supporting brackets and the ends of the turns.

The arrangement and fastening of the two outer rings leads, in combination with the inner ring and the clamping means, to a vibration-resistant winding overhang construction. Supporting the second outer ring on the stator core end plate makes it virtually impossible for the said plate to expand under loading acting radially towards the outside in the case of a short circuit. It can be loaded up to the yield point. Radial vibration components are thereby limited to very small amplitudes. The first outer ring also benefits from this fact. Its ovalization is limited by the radially very rigid supporting brackets. Because the external support of the winding overhang is now very rigid, the actual wedging of the winding bars is very simple: after the inner ring has been pressed in and secured axially, The clamping means arranged between the winding bars are activated. This makes the entire winding overhang unit an extremely low-vibration structure which can withstand all operating stresses, especially in the case of a short circuit. Additional support on the stator housing is fundamentally unnecessary. It may, however, be considered as an additional measure and is simple to implement, for example by means of axially soft leaf springs extending radially inwards which are attached, on the one hand, to the first outer ring and, on the other hand, to the stator housing.

In a special development of the invention, the second outer ring preferably does not rest with its entire inner circumference but only with part of its width (typically ⅕ to ⅓ of the width of the ring) on a shoulder on the stator core end plate. This bearing surface has proven sufficient.

In large electric machines, especially those of great length, unavoidable thermally induced axial relative movements occur between the ends of the turns and the stator laminated core. Without special precautions, these would subject the winding overhang unit to unnecessary stress. For this reason provision is made, in an advantageous further development of the invention, to attach the supporting brackets to the end of the laminated core with the interposition of an axially acting leaf spring and to provide spring means between the second outer ring and the end face of the stator core end plate. The said axially acting leaf springs, together with these spring means, e.g. Bellville spring assemblies, produce a sufficiently high axial preloading force. This acts between the winding overhang and the stator laminated core and compensates for the thermally induced axial displacement of the winding overhang relative to the stator laminated core. In this way, the entire stator winding with both winding overhangs is held in elastically resilient fashion relative to the stator laminated core and the thermally induced expansions do not lead to a loosening of the unit. Spring travels of a few millimeters are sufficient here.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
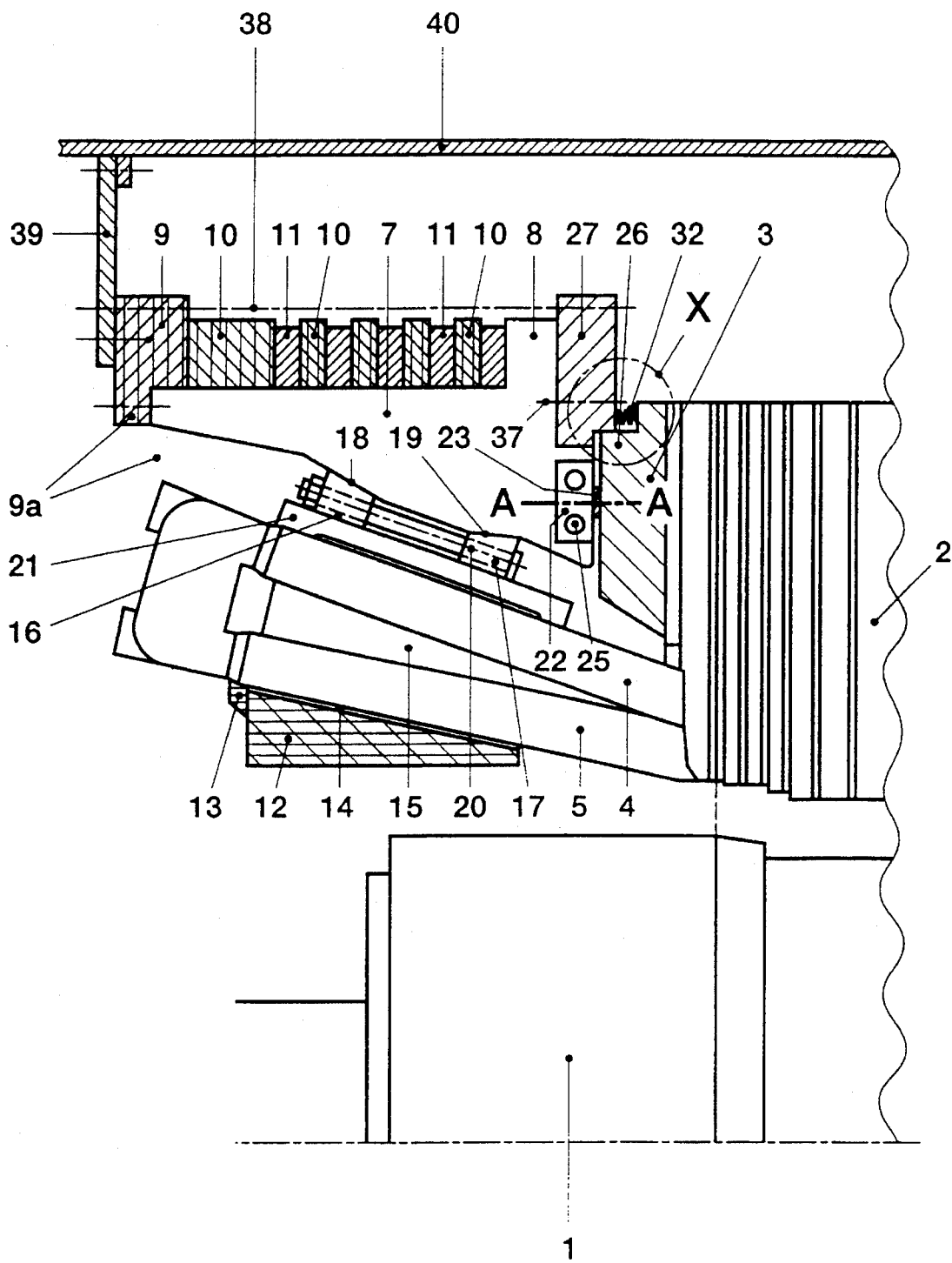
FIG. 1 shows a simplified longitudinal section through the front-end part of a turbo generator.

Referring now to the drawings, wherein like reference numerals designate identical or corresponding parts throughout the several views, in the simplified longitudinal section through the front-end part (N-end or exciter end) of a turbo-generator in accordance with FIG. 1, the reference numeral 1 denotes a rotor, 2 a stator laminated core and 3 its core end plate. The stator winding consists of a bottom bar 4 and a top bar 5, whose ends projecting from the stator laminated core 2, the so-called end bows, are connected to one another electrically and mechanically by means of eyes 6. The totality of all the end bows forms the winding overhang.

Figure 2:
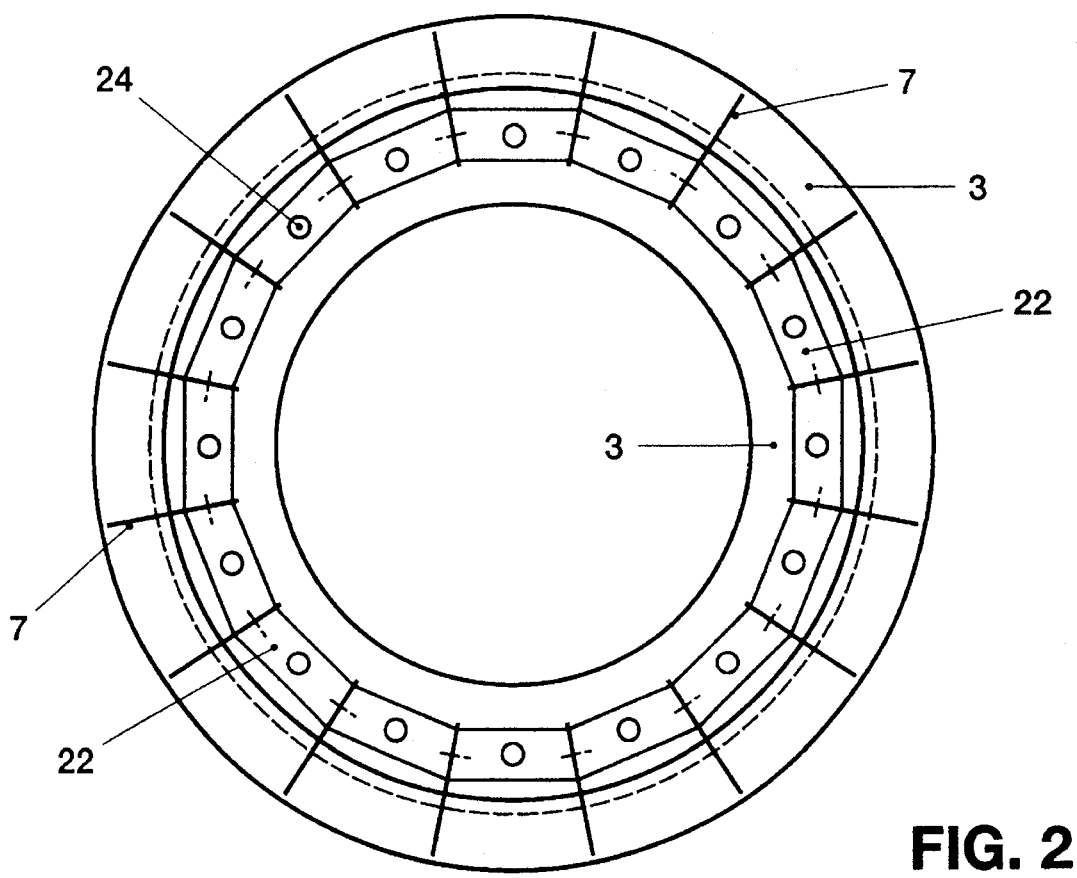
FIG. 2 shows a highly simplified view of the end of the stator.
Figure 3:
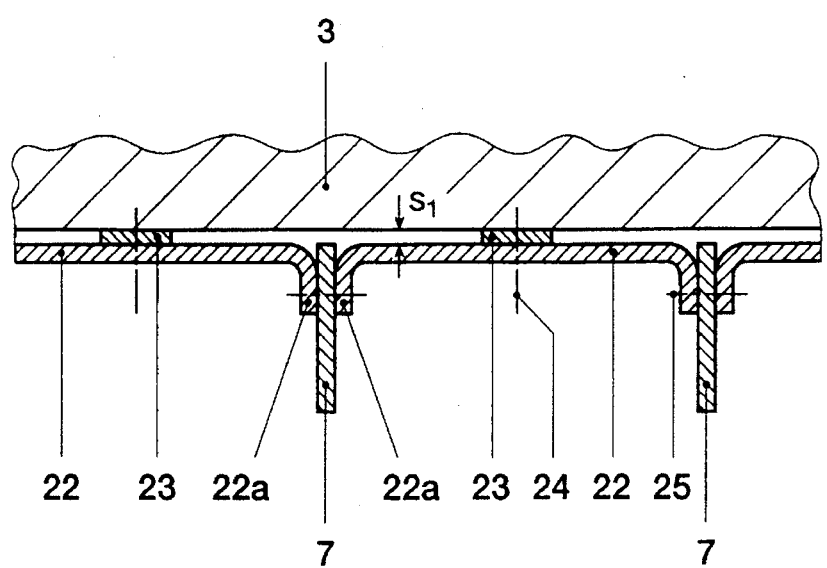
FIG. 3 shows a partial section through the resilient mounting of the supporting brackets on the stator core end plate in accordance with FIG. 1 along the line AA.

To support the winding overhang at the outside, supporting brackets 7 attached to the stator core end plate are provided, their distribution being visible in FIG. 2. These brackets have a radial extension 8 at their stator end. A one-piece ring 9 of L-shaped cross section made of insulating material, referred to below as the first outer ring, fits closely against the outside of the free ends of the supporting brackets 7. At its radially inward-pointing leg 9a, the first outer ring is attached to the end face of the supporting bracket 7. The space between the first ring and the radial extension 8 on the supporting bracket 7 serves to accommodate the ring lines 11, which are separated by spacer blocks 10.

An inner ring 12 made from insulating material, e.g. glass-fiber-reinforced plastic, is inserted into the space bounded by the top bars 5, which widens like an internal taper, and is secured axially by means of retainers 13. The bottom bars 4 of the stator winding are supported on the inner ring 12 with the interposition of an insulating interlayer 14 composed, for example, of glass-fiber mat or chopped-strand mat. Wedge-shaped filler pieces 15 made from insulating material are inserted between the top and bottom bars 4 and 5, being distributed over virtually the entire axial projection of the winding overhang.

The bottom and top bars are wedged by means of a double-wedge arrangement comprising wedges 16, 17 which can be displaced relative to one another, are provided with threaded holes and have opposing wedging surfaces. These interact with likewise opposing wedging surfaces 18, 19 on the supporting bracket 7. The two wedges can be tightened by means of a bolt 20. An interlayer 21 made of insulating material prevents damage to the insulation of the bottom bar 4. The arrangement consisting of the interlayer 21, the bottom bar 4, the filler piece 15, the top bar 5 and the interlayer 14 is braced against the supporting bracket 7 and the inner ring 12 by tightening the bolt.

As already explained at the outset, thermally induced relative motion occurs between the stator winding 4, 5 (composed of insulated copper conductors) and the stator laminated core 2 during the operation of the turbo-generator, especially in the run-up phase and in machines of are at length. This means that the winding overhang unit must not be attached rigidly to the end of the stator laminated core 2 because otherwise loosening in the winding overhang unit and also damage to the conductor insulation may occur. For this reason, the supporting brackets 7 are not attached directly to the end face of the stator laminated core 2, or, more precisely, to the stator core end plate 3, but with the interposition of compensating elements. In the example, U-shaped straps 22 are provided, these being fastened to the stator core end plate 3 at their center by means of screws 24 with the interposition of a spacer 23, resulting in a gap $S_1$. The supporting brackets 7 are inserted into the interspace between the legs 22a, in the circumferential direction of adjacent straps 22, and are fastened there by means of bolts 25 and nuts. In this arrangement, the ends of the supporting brackets on the stator core end plate side do not extend as far as the end face of the stator core end plate. In this way, the strap parts on both sides of the spacers 23 act as axially acting leaf springs and allow a relative motion between the supporting brackets 7 and the stator core end plate 3 and hence the stator laminated core 2. This spring travel is determined in the direction of the stator laminated core 2 by the thickness of the spacers 23.

Without additional supporting measures, this flexibility would reduce the rigidity of the entire winding overhang unit. It is here that the invention intervenes. According to the invention, the stator core end plate 3 is provided at the outer circumference, on its side facing away from the stator laminated core 2, with a shoulder 26 on which a second outer ring 27 rests, at least partially (cf. FIG. 1 and the detail X in accordance with FIG. 1A). The outer ring is composed of high-strength nonmagnetic steel such as that used also for rotor caps. It is provided on the inner circumference with a turned recess 28 having a radial extending surface 29a and an axial extending surface 29b. Between the radially extending surface 29a of this turned recess 28 and the end face 30 of the stator core end plate 3 there remains a gap $S_2$, this being at least as large as the gap $S_1$ between the straps 22 and the stator core end plate 3.

Figure 1A:
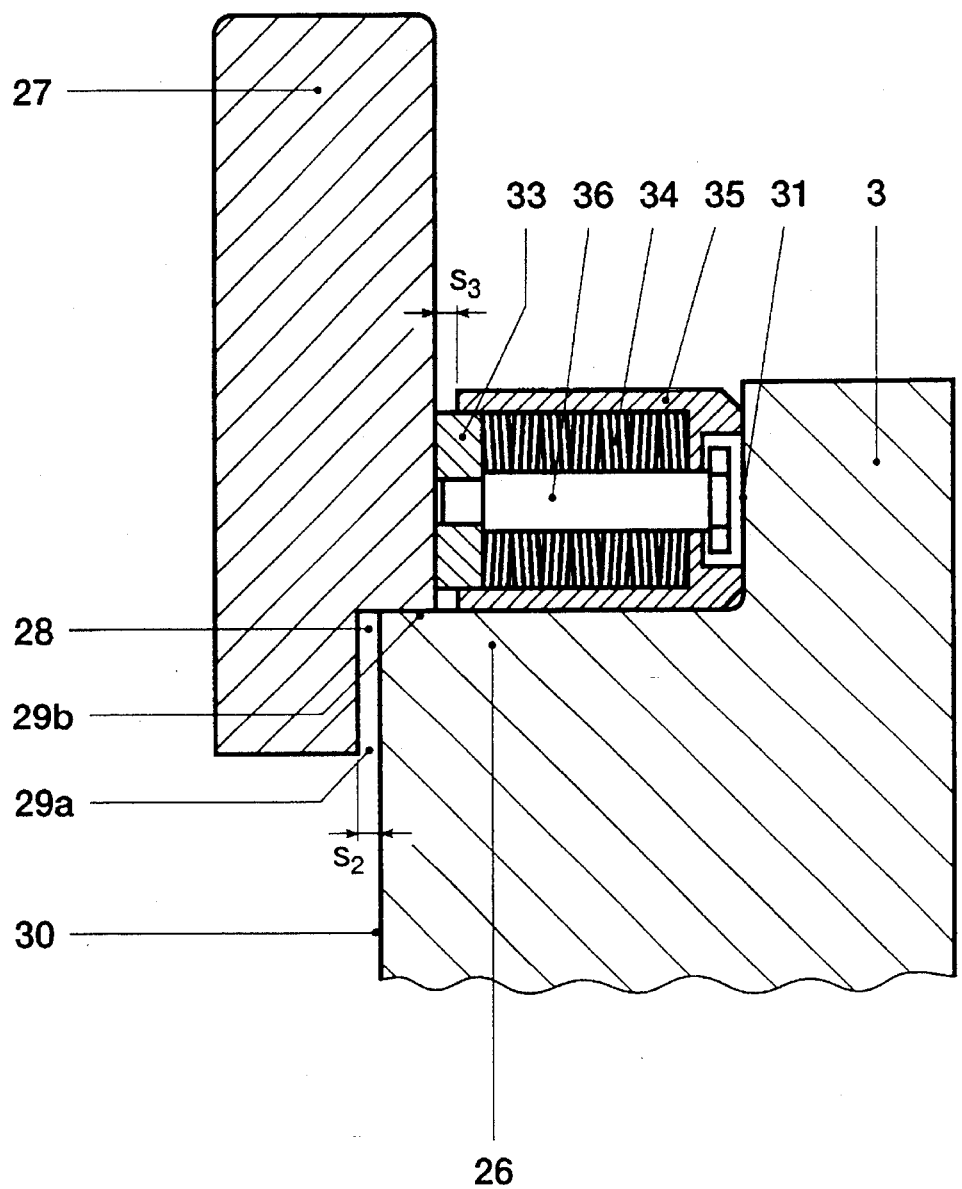
FIG.1A shows the detail X from FIG. 1.

Arranged between that face of the second outer ring 27 which is on the stator laminated core side and the radially extending surface 31 of the shoulder 26 on the core end plate 3 are spring means, denoted in general terms by reference numeral 32, the construction of which can be seen from the detail in accordance with FIG. 1A. They are distributed uniformly around the entire circumference of the ring. A ring nut 33 is attached to the said face on the second outer ring 27. A cap 35 is placed over a Belleville spring assembly 34 and bolted in axially movable fashion to the second outer ring 27 and hence preloaded by means of a bolt 36. The gap $S_3$ between the cap 35 is equal to or only slightly greater than the gap $S_2$ between the surfaces 29a and 30.

The second outer ring 27 is fastened to the supporting brackets 7 by means of bolts 37. The first outer ring 9 is braced with respect to the second outer ring 27 by means of tie bolts 38. This construction allows limited axial movements of the entire winding overhang unit relative to the stator laminated core counter to the spring force of the axial leaf springs (U-shaped straps 22) and of the leaf spring assemblies 34 but is extremely rigid radially because the second outer ring 27 can only expand, but cannot become oval in the case of a short circuit, because it rests on the shoulder 26.

Even greater radial reinforcement of the winding overhang can be achieved if —as shown in FIG. 1 —the first outer ring 9 is attached to the stator housing 40 by means of radially extending straps 39. These straps 39 act as axially soft leaf springs but are radially rigid. The straps 39 are distributed uniformly around the circumference of the housing and are either attached separately to the first outer ring 9 or with the tie bolts 38.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for holding ends of turns of a stator winding in a dynamoelectric machine, comprising:

a rotor and a stator and a stator housing, which stator has a laminated core with a stator core end plate at an end of said stator core, a stator winding arranged in slot in the laminated core, said stator winding having bottom and top bars, said bars having ends which overlap the laminated core axially;

an inner ring which fits closely against the ends of the turns of the stator winding, which turns widen as an internal taper, and which has a multipart external support comprising rings and supporting brackets, which supporting brackets are attached to an end of the stator core end plate of the laminated core, wherein a first outer ring is provided which fits closely against an outside of free ends of the supporting brackets, wherein a second outer ring is provided which is supported at an inside circumference on a shoulder on the stator core end plate, wherein the second outer ring is attached to the supporting brackets and wherein clamping means are provided between inward-facing surfaces of the supporting brackets and the ends of the turns.

2. The device as claimed in claim 1, wherein the supporting brackets are attached to the end of the laminated core with the interposition of a leaf spring.

3. The device as claimed in claim 2, wherein the leaf springs are formed by U-shaped straps which are each fastened to the stator laminated core in a central portion of each of the straps with interposition of a spacer, and wherein the supporting brackets are fastened to the legs of the U-shaped straps.

4. The device as claimed in claim 1, wherein axially acting spring means are provided between the second outer ring and the stator core end plate.

5. The device as claimed in claim 4, wherein the spring means comprise Belleville spring assemblies which are uniformly distributed around the circumference of the ring and are each surrounded by a cap, which caps are attached in axially displaceable fashion to the second outer ring.

6. The device as claimed in claim 1, wherein the second outer ring has, on the inner circumference, a turned recess with a radially extending surface which leaves free a gap between it and the end face of the stator core end plate, while the other surface rests directly on the shoulder of the stator core end plate.

7. The device as claimed in claim 1, wherein the clamping means have a double-wedge arrangement with opposing wedging surfaces which interact with opposing wedging surfaces on the supporting brackets.

8. The device as claimed in claim 2, wherein axially acting spring means are provided between the second outer ring and the stator core end plate.

9. The device as claimed in claim 3, wherein axially acting spring means are provided between the second outer ring and the stator core end plate.

10. The device as claimed in claim 2, wherein the second outer ring has, on the inner circumference, a turned recess with a radially extending surface which leaves free a gap between it and the end face of the stator core end plate, while the other surface rests directly on the shoulder of the stator core end plate.

11. The device as claimed in claim 3, wherein the second outer ring has, on the inner circumference, a turned recess with a radially extending surface which leaves free a gap between it and the end face of the stator core end plate, while the other surface rests directly on the shoulder of the stator core end plate.

12. The device as claimed in claim 4, wherein the second outer ring has, on the inner circumference, a turned recess with a radially extending surface which leaves free a gap between it and the end face of the stator core end plate, while the other surface rests directly on the shoulder of the stator core end plate.

13. The device as claimed in claim 5, wherein the second outer ring has, on the inner circumference, a turned recess with a radially extending surface which leaves free a gap between it and the end face of the stator core end plate, while the other surface rests directly on the shoulder of the stator core end plate.

14. The device as claimed in claim 2, wherein the clamping means have a double-wedge arrangement with opposing wedging surfaces which interact with opposing wedging surfaces on the supporting brackets.

15. The device as claimed in claim 3, wherein the clamping means have a double-wedge arrangement with opposing wedging surfaces which interact with opposing wedging surfaces on the supporting brackets.

16. The device as claimed in claim 4, wherein the clamping means have a double-wedge arrangement with opposing wedging surfaces which interact with opposing wedging surfaces on the supporting brackets.

17. The device as claimed in claim 5, wherein the clamping means have a double-wedge arrangement with opposing wedging surfaces which interact with opposing wedging surfaces on the supporting brackets.

18. The device as claimed in claim 6, wherein the clamping means have a double-wedge arrangement with opposing wedging surfaces which interact with opposing wedging surfaces on the supporting brackets.

* * * * *